UNITED STATES PATENT OFFICE.

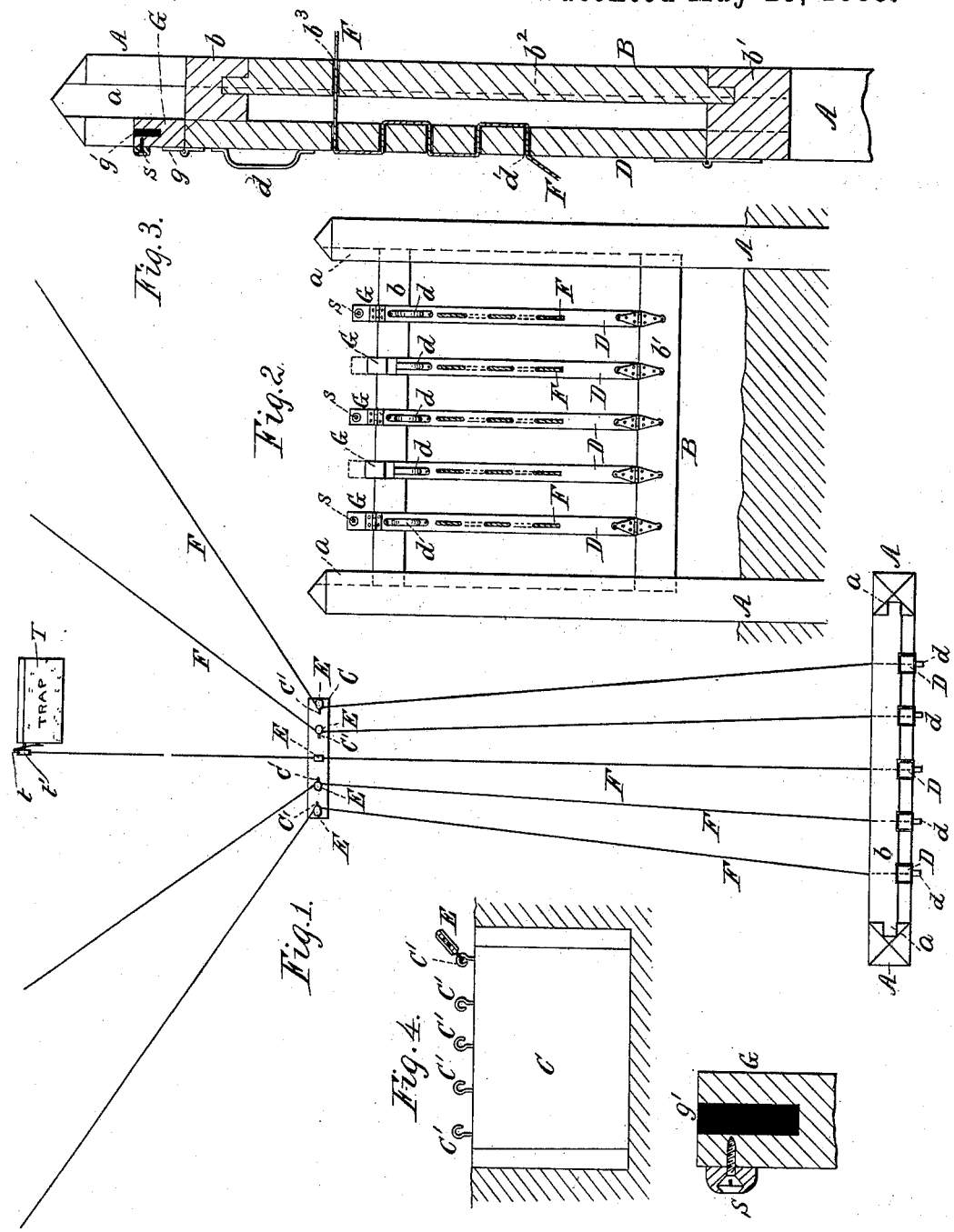

AUGUSTUS C. DICK, OF CINCINNATI, OHIO.

APPARATUS FOR SPRINGING TARGET-TRAPS.

SPECIFICATION forming part of Letters Patent No. 383,446, dated May 29, 1888.

Application filed January 18, 1888. Serial No. 261,101. (No model.)

*To all whom it may concern:*

Be it known that I, AUGUSTUS C. DICK, a citizen of the United States, and a resident of the city of Cincinnati, in the county of Hamilton and State of Ohio, have invented certain new and useful Improvements in Devices for Springing Traps for Throwing Flying Targets, of which the following is a specification.

The several features of my invention and the advantages arising from their use, conjointly or otherwise, will be apparent from the following description.

In the accompanying drawings, forming part of this specification, Figure 1 is a plan view of the device. Fig. 2 is a front elevation of the frame carrying the pull-levers and attachments, as hereinafter fully specified. Fig. 3 is a vertical cross-section of the device shown in Fig. 2, taken vertically through the center of one of the pull-levers. Fig. 4 illustrates the sunken fulcrum-block and its attachments.

The posts A A are sunk in the ground at convenient place on the trap-shooting field, and are intended to remain there permanently.

The operative parts of the frame containing the pull-levers are attached to the posts A in such a way as to admit of ready attachment and detachment. The preferred form as illustrated provides for a frame, B, composed of cross-pieces $b$ $b'$, connected by a series of vertical strips, $b^2$, or a continuous board taking the place of said strips $b^2$, the whole frame sliding in the grooves $a$ in the posts A.

The frame may be easily lifted out from the posts and taken to a place of safety when the shooting is over. One or more pull-levers, D, are hinged to the lower portion of the sliding frame, preferably to the lower cross-piece, $b'$. Each lever is preferably provided with a handle, $d$. Some distance in front of the shooting-frame a block, C, is firmly embedded in the ground, and is provided on its upper face with a series of hooks, C', into each of which is hooked a pulley, E, preferably a swiveled pulley. The traps are set at convenient places in front of the frame carrying the pull-levers, and from each trap a cord or chain or other line, F, extends to the said frame B. At the traps these lines F are connected with the triggers, preferably by means of a snap-hook. Thence, in the traps now used, the line passes down and around a pulley fastened to the lower portion of the trap, preferably by a snap-hook, to admit of the ready connection of the pulley to the trap and its detachment therefrom. Thence each line passes through one of the pulley-blocks E, then to the frame B. Then, in cases where the strips $b^2$ are directly in front of the levers D, each line passes through an opening, $b^3$, in one of the vertical strips or the board $b^2$. Each line is then attached to the adjacent pull-lever D. The preferred method of attaching the lines to the pickets is to provide each picket with openings $d'$, and to pass the lines back and forth through these openings, as illustrated in Fig. 3. This mode of attachment of the line permits its tension to be readily adjusted.

The mode of operation of the device is as follows: When it is desired to spring a trap, the lever connected with that trap is pulled back and the trap sprung or discharged. On releasing the lever the tension of the line draws it back into position against the cross-piece $b$. It is very desirable to provide each lever with some device to indicate that the trap connected with it has been sprung. The preferred form of indicator consists of a block, G, resting on the top of the lever and connected to the front face by a hinge, $g$. This indicator is preferably weighted by a plug of heavy metal, G', set in the top. When the lever is drawn forward to spring or discharge a trap, its inclined position lets the indicator drop, and the latter remains down, when the lever returns to its place. In Fig. 2 the indicators of the second and fourth levers are shown down, indicating that the corresponding traps have been discharged. In order to render noiseless the fall of the indicator, the latter is provided with a soft substance, S, on that face which, when the indicator has fallen, impinges against the pull-lever. This substance is preferably rubber. A convenient form of said rubber is a rubber button screwed to the indicator, as shown in Fig. 3. After the shooting for the time has been finished, the frame with pull-levers can be removed from the posts and the pulleys E detached from their respective hooks C, and the rope and pulley at the trap disconnected from the trap, and the frame-levers, ropes, and pulleys all be carried under shelter and to a place of safety. This detachment of the frame and pulleys and lines and their subsequent attachment for the next shoot is the work of only a few minutes. In place of the grooves $a$ in the posts A, rabbets may be made in the posts and the frame laid in these rabbets and buttoned or hooked fast; but I prefer the grooves $a$.

While the various features of my invention are preferably employed together, one or more of said features may be employed without the remainder, and in so far as applicable one or more of said features may be used in connection with devices for discharging traps other than what is herein specifically set forth. For example, the pulls D may be of other description than hinged levers, and yet be made to work efficiently in connection with one or more of the features of my invention. The line F can pass direct from the pull, as D, to the trap; but this is objectionable, as when the connection at E is omitted there would be too much slack rope over the field, and the position of the ropes would be too high over the field and be in the way of the trapper in walking to and fro over the field in loading and setting the trap.

What I claim as new, and desire to secure by Letters Patent, is—

1. The combination of posts A, detachable frame B, provided with levers D, hinged to the frame B, block C, provided with hooks C' and pulleys E, traps, and lines F, passing from the pickets to the traps through the pulleys E, substantially as and for the purposes specified.

2. The combination of posts A, provided with grooves $a$, frame B, sliding in grooves $a$, and provided with strips $b^2$ and pulls D, block C, located between the lever and the trap and provided with hooks C' and pulleys E, traps, and lines F, passing from the levers to the traps through the pulleys, substantially as and for the purposes specified.

3. The combination of lever D, drop-indicator G, hinged to the top of the lever, a trap, line F, connecting the trap and the lever, and fulcrum-pulley E, located between the trap and the lever, substantially as and for the purposes specified.

4. The combination of lever D, drop-indicator G, provided with weight $g'$ and hinged to the top of the lever, a trap, line F, connecting the trap and the lever, and fulcrum-pulley E, located between the trap and the lever, substantially as and for the purposes specified.

5. The combination of hinged lever D, provided with openings $d'$, a trap, line F, laced through openings $d'$ and connecting the lever and the trap, and intermediate fulcrum-pulley, E, substantially as and for the purposes specified.

6. The combination of a trap, a pull independent of and separate from said trap, drop-indicator attached to the pull, and the line connecting the pull and the trap, substantially as and for the purposes specified.

AUGUSTUS C. DICK.

Attest:
A. L. HERRLINGER,
WM. E. JONES.